(12) United States Patent
Wang et al.

(10) Patent No.: US 8,303,211 B2
(45) Date of Patent: Nov. 6, 2012

(54) METHOD AND PAVEMENT STRUCTURE FOR PROTECTING HIGHWAY SUBGRADE IN FROZEN SOIL AREA

(75) Inventors: Shuangjie Wang, Xi'an (CN);
Shengyue Wang, Nanjing (CN);
Jianbing Chen, Xi'an (CN); Xiaofeng Zhou, Nanjing (CN); Juan Zhang,
Xi'an (CN); Qiyang Zhu, Nanjing (CN)

(73) Assignees: CCCC First Highway Consultants Co., Ltd, Xi'an, Shaanxi Province (CN);
Southeast University, Nanjing, Jiangsu Province (CN)

( * ) Notice: Subject to any disclaimer, the term of this patent is extended or adjusted under 35 U.S.C. 154(b) by 95 days.

(21) Appl. No.: 12/989,782

(22) PCT Filed: Dec. 31, 2009

(86) PCT No.: PCT/CN2009/076362
§ 371 (c)(1),
(2), (4) Date: Oct. 26, 2010

(87) PCT Pub. No.: WO2011/079468
PCT Pub. Date: Jul. 7, 2011

(65) Prior Publication Data
US 2011/0243659 A1 Oct. 6, 2011

(51) Int. Cl.
*E01C 7/00* (2006.01)
*B82Y 30/00* (2011.01)
(52) U.S. Cl. ............ 404/76; 404/17; 404/27; 404/75; 977/902

(58) Field of Classification Search .............. 404/17, 404/18, 31, 19–21, 27, 32, 75, 76, 79, 90–92; 405/130, 258.1; 977/902
See application file for complete search history.

(56) References Cited

U.S. PATENT DOCUMENTS

| | | | | |
|---|---|---|---|---|
| 3,722,378 A | * | 3/1973 | Best | 404/31 |
| 4,174,912 A | * | 11/1979 | Peterson | 404/27 |
| 4,606,963 A | * | 8/1986 | Farrell | 428/150 |
| 4,708,516 A | * | 11/1987 | Miller | 404/31 |
| 6,306,976 B1 | * | 10/2001 | Matsuda et al. | 525/316 |
| 6,488,762 B1 | * | 12/2002 | Shi | 106/676 |
| 7,524,136 B2 | * | 4/2009 | Stenger | 404/72 |
| 7,687,104 B2 | * | 3/2010 | Moon et al. | 427/136 |
| 2011/0003904 A1 | * | 1/2011 | Guevara et al. | 521/59 |
| 2011/0124483 A1 | * | 5/2011 | Shah et al. | 501/32 |

* cited by examiner

*Primary Examiner* — Raymond W Addie
(74) *Attorney, Agent, or Firm* — Christie, Parker & Hale, LLP

(57) ABSTRACT

The present invention provides a method and pavement structure for protecting highway subgrade in frozen soil areas. The pavement structure has two or more pavement layers having gradient thermal conductivity; the thermal conductivity is layered among the pavement layers and is lowered from top to bottom, so that the pavement forms a uni-directional thermal conducting tunnel from the subgrade to the air. Heat can be easily released from the subgrade into the air, and is prevented from being transferred from the air to the subgrade. In this way, the frozen soil layer beneath the subgrade is cooled, so that the frozen soil table is made stable, and the highway subgrade in frozen soil areas is protected.

14 Claims, 1 Drawing Sheet

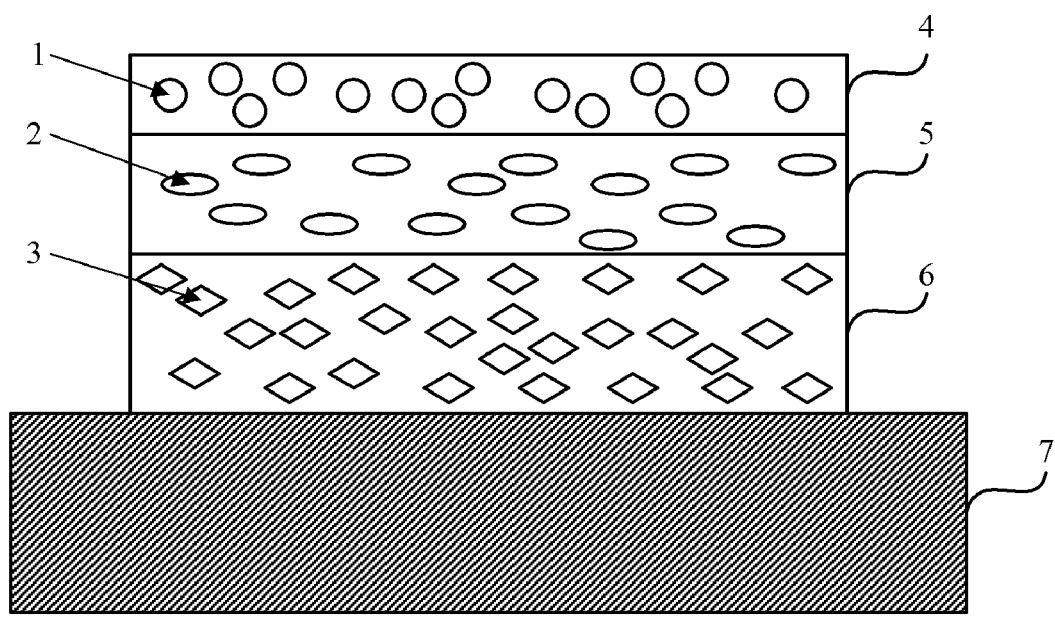

METHOD AND PAVEMENT STRUCTURE FOR PROTECTING HIGHWAY SUBGRADE IN FROZEN SOIL AREA

CROSS-REFERENCE TO RELATED APPLICATION(S)

This application is a National Phase Patent Application of International Patent Application Number PCT/CN2009/076362, filed on Dec. 31, 2009.

FIELD OF THE INVENTION

The present invention related to techniques for protecting highway subgrade in frozen soil area, and particularly, to method and pavement structure for protecting highway subgrade in frozen soil area.

BACKGROUND OF THE INVENTION

Frozen soil is a type of soil medium which is rich in underground ice, very sensitive to temperature, and has rheological characteristics.

Qinghai-Tibet highway is the world's first asphalt road paved in a high-and-cold frozen soil area. The "black surface close over" characteristic of asphalt pavement makes the road absorb a mass of the sun's heat energy in warm seasons, and meanwhile, retards evaporation of water. But in cold seasons, massive heat accumulated in the subgrade can not be released. Since the frozen soil is very sensitive to temperature, repeated freezing and melting alternations make the subgrade instable, which results in frequent highway disease.

In plateau permafrost areas, descending of permafrost table under subgrade is the main cause of uneven settlement of subgrade, and threatens the stability of subgrade. Highway engineering in each cold region of the world are faced with similar problems. In order to curb the descending of permafrost table, subgrade protection measures are generally taken in frozen soil-related engineering. The protection measures mainly include: techniques such as subgrade lifting, ventilation tube, block stone (crushed stone) subgrade, block stone (crushed stone) revetment, thermal insulation layer, heat-conducting tube, diatomite revetment, sun shield, and so on.

The subgrade lifting and ventilation tube techniques are among the most commonly-adopted engineering measures in frozen soil protection engineering. In the 1985-1999 stage 3 of renovation and reconstruction of asphalt pavement in permafrost areas by Qinghai-Tibet highway research group, the subgrade in general was raised by approximately 3 meters. But after that, subgrade defects resulted from temperature differences between temperature fields on the sunny and shady sides began emerging. The left side (the sunny side) of the highway suffers from road border collapsing and longitudinal cracking; meanwhile the raised subgrade makes the thaw layer under the subgrade thickened, and settlement deformation of the subgrade becomes larger, which brings about massive hidden troubles for stability of the subgrade. Measures of pre-laying ventilation tubes in subgrade and embankment can also achieve some effect. However, since the ventilation tube measure is based on forced convection heat transfer mechanism, the ventilation tubes are effective only when they are laid a certain distance higher than the natural surface, which enlarges the side slope area of the embankment and results in shady-sunny effect of the subgrade. For this reason, the ventilation tube measure is not very effective in practical usage. Current various improved ventilation tubes proposed in subgrade of domestic plateau permafrost areas have similar effects.

The block stone (crushed stone) subgrade technique is also a protection measure which is for cooling the subgrade. The block stone (crushed stone) subgrade is ventilated and cooled by utilizing the pores in the block stone pile. Research results of LAI, Yuanming ("Temperature Features of Broken Rock Mass Embankment in the Qinghai-Tibetan Railway", Journal of Glaciology and Geocryology, Issue 03, 2003) show that the ripped-rock subgrade cooling technique is related with temperature differences between the top and bottom of the ripped-rock layer and the riprap grain size. When a critical condition is hard to be met, the cooling property of the ripped-rock layer will not work. Since the ripped-rock layer is wide (generally 20 m in width), the middle part has poor or no ventilating property, which reduces the ventilating ability of the ripped-rock layer. In plateau permafrost areas, the temperature of the permafrost under the road does not go down, and even goes up in some areas. "Research Report on Heat Insulation Testing Project of Ripped-rock and Ripped-rock revetment, 2003: Sub-report of Report of Research results on key techniques about road bridge and culvert in thick subsurface ice regions (Bailu River)" by SUN, Zhizhong et. al. studies the cooling effect of block stone (crushed stone) revetment subgrade in Bailu River testing phase of Qinghai-Tibet railway, and points out that: the block stone (crushed stone) revetment subgrade has good cooling effect of the frozen soil at the foot of the slope, but the temperature of soil mass at the middle part of the subgrade is still relatively high, and the unevenness of temperature fields may results in uneven deformation of the subgrade and even longitudinal cracking, which may harm traffic safety.

In addition, industrial thermal insulation materials are also not applicable in high-temperature permafrost areas, while the industrial thermal insulation materials used in low-temperature permafrost areas may cause heat to accumulate in the subgrade which causes the permafrost table to descend.

Heat-conducting tubes have a problem of caloric leakage. Once the caloric leaks, the heat-conducting tubes will no longer be used. Further, the performances of the heat-conducting tubes depend on influences of climate conditions, unit weight and water content of surrounding soil mass.

Although diatomite revetment technique is a theoretically feasible measure for protecting permafrost, it is hard for diatomite revetment to function properly as a thermal diode in plateau permafrost areas due to insufficient water supply.

The sun shield technique has remarkable cooling function, is an effective engineering measure for lowering the temperature of the permafrost under the subgrade. But the sun shield technique has drawbacks such as high costs in building and repairing, vulnerability to harsh environment, e.g., gales, etc. of Qinghai-Tibetan Plateau, preventing the slope from slope vegetation, dangerous to drivers due to the light reflected by the white color of sun shield.

In view of the above current subgrade protection measures for highway in frozen soil areas, there is still no effective and low-cost protection measure.

SUMMARY OF THE INVENTION

Embodiments of the present invention provide a method for protecting highway subgrade in frozen soil areas, which has low construction complexity and low cost while protecting highway subgrade in frozen soil areas effectively.

Embodiments of the present invention provide a pavement structure which has low construction complexity and low cost while being able to protect highway subgrade in frozen soil areas effectively.

To attain the above objectives, the specific solution in accordance with this invention is as follows.

A method for protecting highway subgrade in frozen soil areas may include:

paving, on a subgrade, at least two pavement layers which have gradient thermal conductivity; arranging the at least two pavement layers in a descending order of thermal conductivity from top to bottom.

A pavement structure may include:

at least two pavement layers which have gradient thermal conductivity;

wherein the at least two pavement layers are arranged in a descending order of thermal conductivity.

Through the above technical schemes, the method and pavement structure for protecting highway subgrade in frozen soil areas provides a pavement structure having gradient thermal conductivity which has uni-directional thermal conductive functions. When the pavement absorbs heat in warm seasons, radiant energy is transferred from an upper layer with a high thermal conductivity to a medium layer. Since the thermal conductivity of a medium layer is smaller than the upper layer, thermal resistance becomes larger, and part of the heat is re-transferred to the upper layer and reaches the air. Another part of the heat is conducted to a lower layer with a smaller thermal conductivity. Thermal resistance of the lower layer is very large, so part of the heat is re-transferred to the medium layer, then transferred from the medium layer to the upper layer, and finally reaches the air. Only small quantity of heat is transferred from the lower layer to the subgrade. In this way, heat is prevented from being transferred from above the pavement to the subgrade and permafrost beneath the subgrade. During a heat releasing process in cold seasons, when heat accumulated in the subgrade and permafrost beneath the subgrade reaches the upper layer via the medium layer, since the thermal conductivity gradient between layers is large, the big inter-layer temperature difference make the heat accumulated in the frozen soil disperse into the air easily, thereby maintains the low temperature of the frozen soil. During a cycle of warm seasons and cold seasons, the frozen soil keeps releasing heat and heat is not easy to accumulate to result in melt deformation of the frozen soil, thereby the frozen soil and the subgrade can be protected. Further, the present invention can adopt conventional road surface construction measures for constructing the pavement, can make use of conventional road surface construction, maintenance and recovery techniques, and has merits such as low construction complexity, low cost and so on.

BRIEF DESCRIPTION OF THE DRAWINGS

FIG. 1 is a block diagram illustrating a highway pavement structure in accordance with an embodiment of the present invention.

DETAILED DESCRIPTION OF THE INVENTION

This invention is hereinafter further described in details with reference to the accompanying drawings as well as embodiments so as to make the objective, technical solution and merits thereof more apparent.

The present invention is mainly based on the theory of thermal conduction, forms a structure of gradient thermal conductivity with top to bottom pavement layers arranged in a descending order of thermal conductivity to make the pavement become a uni-directional thermal conducting tunnel conducting heat from the subgrade to the air. The pavement structure makes heat easy to disperse from the subgrade to the air and prevents heat from being delivered from the air to the subgrade. In this way, the frozen soil layer beneath the subgrade can be cooled with the frozen soil table raised, thickness of the thaw layer reduced. Thus, the stability of the frozen soil and the subgrade is maintained, operation capability of frozen soil areas is improved, and highway and highway subgrade in frozen soil areas can be protected.

Generally, gradient thermal conductivity is not easy to be implemented in a single pavement layer, and is infeasible in large scale highway construction. In order to implement a pavement structure having gradient thermal conductivity, the present invention provides a multi-layer pavement structure having two or more layers with different pavement layers having different thermal conductivity. Therefore, a pavement structure with thermal conductivity has gradient distribution among the pavement layers.

A typical three-layer pavement structure can be taken as an example. In the example, the pavement layers are divided into three layers, i.e., a top layer, a medium layer and a bottom layer. Among the three layers, the top layer has the highest thermal conductivity, the bottom layer has the lowest thermal conductivity, and the thermal conductivity of the medium layer is between that of the top layer and the bottom layer.

The top layer with high thermal conductivity can be implemented by adding micro nano powder having high thermal conductivity into the top layer, the bottom layer with low thermal conductivity can be implemented by adding micro nano powder having low thermal conductivity into the bottom layer, and the medium layer with mid-value thermal conductivity can be implemented by adding micro nano powder having mid-value thermal conductivity into the medium layer or by adding fewer micro nano powder having low thermal conductivity into the medium layer than in the bottom layer (e.g., the amount of micro nano powder having low thermal conductivity added into the medium layer may be ½~1/10 of that added into the bottom layer), or by adding no micro nano powder.

The highway pavement structure obtained according to the above method is as shown in FIG. 1.

The highway pavement layers is paved on subgrade 7, including top layer 4, medium layer 5 and bottom layer 6 from top to bottom. The top layer 4 is interspersed with micro nano powder 1 which has high thermal conductivity, the medium layer 5 is interspersed with micro nano powder 2 which has mid-value thermal conductivity, and the bottom layer 6 is interspersed with micro nano powder 3 which has low thermal conductivity.

The micro nano powder 1 with high thermal conductivity makes the whole top layer 4 has high thermal conductivity, the micro nano powder 3 with low thermal conductivity makes the whole bottom layer 6 has low thermal conductivity, and the whole medium layer 5 has thermal conductivity between that of the top layer 4 and the bottom layer 6. Thus, the pavement layers have gradient thermal conductivity with the thermal conductivity becoming lower from top to bottom.

The micro nano powder 1 with high thermal conductivity can be graphite material or carborundum. The micro nano powder 2 with mid-value thermal conductivity can be silicon-oxide, aluminum oxide, zinc oxide, and so on. The micro nano powder 3 with low thermal conductivity can be mica powder, xylem fiber, fly ash, floater, sinking micro-sphere, glass wool, slag, polyurethane foaming plastic, polystyrene foam plastics, polyvinyl chloride foam plastics and so on. The micro nano powder may have only one component, or may be a mixture of different components according to an arbitrary mixture radio.

The above different micro nano powder with different thermal conductivity may also adopt any other materials having similar thermal conductivity characteristics. The examples listed in the present invention are additives that have low cost, are easily found, environment-friendly and can be used repetitively, e.g., raphite material and carborundum are frequently-used industrial raw materials; fly ash, floater, sinking micro-sphere, glass wool, slag, etc. are conventional industrial waste; and xylem fiber, polyurethane foaming plastic, polystyrene foam plastics, polyvinyl chloride foam plastics, etc. are organic fiber.

The amount of micro nano powder of different thermal conductivity added into the pavement layers may be determined according to required thermal conducting effects and required costs. For example, the top pavement layer may contain 1%~10% of micro nano powder 1 having high thermal conductivity with a powder grain size of 0.5~500 micrometers. The medium pavement layer may contain 1%~10% of micro nano powder 2 having mid-value thermal conductivity with a powder grain size of 0.5~500 micrometers. The bottom pavement layer may contain 5%~40% of micro nano powder 3 having low thermal conductivity with a powder grain size of 0.25~400 micrometers.

For another example, the top pavement layer may contain 1%~10% micro nano powder 1 having high thermal conductivity with a powder grain size of 0.5~500 micrometers. The medium pavement layer does not have micro nano powders added, and the bottom pavement layer may contain 5%~40% of micro nano powder 3 having low thermal conductivity with a powder grain size of 0.25~400 micrometers.

For yet another example, the top pavement layer may contain 1%~10% micro nano powder 1 having high thermal conductivity with a powder grain size of 0.5~500 micrometers. The medium pavement layer may contain 1%~10% of micro nano powder 3 having low thermal conductivity with a powder grain size of 0.25~400 micrometers. The bottom pavement layer may contain 5%~40% of micro nano powder 3 having low thermal conductivity, and the powder grain size may be 0.25~400 micrometers.

The powder may be added by substituting mineral powder in the mixed base materials for pavement layers with the micro nano powder.

The range of the powder grain size may be much wider. The micro nano powder of 0.25~400 micrometers or of 0.5~500 micrometers has better tensile strength, toughness, ductility and endurance, and has larger specific surface area, thus the pavement base materials may have better strength and mechanic properties besides having the required thermal conductivity after the powder is added. Therefore, the road performances of the pavement can be improved remarkably. Meanwhile, since only small amount of powder is added, the cost of the pavement is low.

In practical construction, the subgrade 7 may be tamped down first, then on the subgrade 7, the bottom 6 modified by the powder 3 having low thermal conductivity is paved; after being tamped down, on the bottom layer 6, the medium layer 5 modified by the powder 2 having mid-value thermal conductivity or by the powder 3 having low thermal conductivity or the medium layer 5 free of micro nano powder is paved; after being tamped down, on the medium layer 5, the top layer 4 modified by the powder 1 having high thermal conductivity is paved, thereby the pavement having layered gradient thermal conductivity is finally generated.

During warm seasons, when radiant energy of the sun is transferred from the top layer 4 to the medium layer 5, part of the heat transferred to the medium layer 5 is transferred back to the top layer 4 and returns to the air because the thermal conductivity of the medium layer 5 is lower than that of the top layer 4 which makes the medium layer 5 have a relatively large thermal resistance. Similarly, part of the heat which went through the medium layer 5 and reached the bottom layer 6 is also transferred to the air via the medium layer 5 and the top layer 4. Only very little sun radiant energy can be transferred to the subgrade 7. Thus, the pavement structure has thermal insulation property, and can effectively prevent the sun radiant energy from being transferred to the subgrade and the permafrost.

In cold seasons, since the pavement layers have gradient thermal conductivity which becomes lower from the top to the bottom, heat accumulated beneath the subgrade can easily be transferred to the medium layer 5 when going through the bottom layer 6 and reaching the medium layer 5 because the gradient of thermal conductivity of the medium layer is large, i.e., the inter-layer temperature difference is large. Likewise, the heat can also easily enter the top layer 4 and be dispersed into the cold air. Therefore, the pavement structure also has heat-absorbing property, can release heat accumulated in and beneath the subgrade into the air above the road surface It can be seen from the above embodiments that the method and pavement structure for protecting highway in frozen soil areas provided by the present invention can generate a gradient thermal conductivity structure with uni-directional thermal conducting property, so that the highway and the subgrade will not be easily deformed and cracked by the melting of frozen soil, and a good protection effect can be achieved. The additives to the pavement used by the present invention are low in cost, small in amount, easy to be obtained. Further, the pavement has low cost and is easy to be constructed. In addition, the protection is implemented by utilizing special pavement materials and special pavement structure instead of utilizing devices and components that need maintenance, the maintenance work is remarkably reduced, and maintenance cost is also greatly lowered.

The foregoing are only preferred embodiments of the present invention and are not for use in limiting this invention, any modification, equivalent replacement or improvement made under the spirit and principles of this invention is included in the protection scope of this invention.

The invention claimed is:

1. A method for protecting highway subgrade in frozen soil areas, comprising:
   paving, on a subgrade, at least two pavement layers which have gradient thermal conductivity;
   arranging the at least two pavement layers in a descending order of thermal conductivity from top to bottom;
   wherein the pavement layers comprises a top layer, a medium layer and a bottom layer and thermal conductivity is layered among pavement layers, the top layer has the highest thermal conductivity, the bottom layer has the lowest thermal conductivity, and the thermal conductivity of the medium layer is between the thermal conductivity of the top layer and the thermal conductivity of the bottom layer; and
   wherein the arranging of the at least two pavement layers in a descending order of thermal conductivity from top to bottom comprises:
   adding micro nano powder having high thermal conductivity into the top layer;
   adding micro nano powder having low thermal conductivity into the bottom layer; and adding no micro nano powder into the medium layer, or adding micro nano powder having mid-value thermal conductivity into the medium layer or adding the micro nano powder having low thermal conductivity into the medium layer with the amount of the micro nano powder added into the medium layer being ½~1/10 of the amount of the micro nano powder added into the bottom layer.

2. The method of claim 1, wherein adding micro nano powder into the pavement layers comprises:
substituting mineral powder in pavement base mixed materials with the micro nano powder.

3. The method of claim 1, wherein the adding micro nano powder having high thermal conductivity into the top layer comprises adding 1%~10% of micro nano powder having high thermal conductivity into the top layer;
wherein the adding micro nano powder having low thermal conductivity into the bottom layer comprises adding 5%~40% of micro nano powder having low thermal conductivity into the bottom layer; and
wherein the adding micro nano powder having mid-value thermal conductivity into the medium layer or the adding the micro nano powder having low thermal conductivity into the medium layer with the amount of the micro nano powder added into the medium layer being ½~1/10 of the amount of the micro nano powder added into the bottom layer comprises adding 1%~10% of micro nano powder having mid-value thermal conductivity into the medium layer, or adding 1%~10% of micro nano powder having low thermal conductivity into the medium layer.

4. The method of claim 3, wherein the micro nano powder having high thermal conductivity comprises any or any combination of graphite material and carborundum;
wherein the micro nano powder having mid-value thermal conductivity comprises any or any combination of siliconoxide, aluminum oxide and zinc oxide; and
wherein the micro nano powder having low thermal conductivity comprises any or any combination of mica powder, xylem fiber, fly ash, floater, sinking micro-sphere, glass wool, slag, polyurethane foaming plastic, polystyrene foam plastics and polyvinyl chloride foam plastics.

5. The method of claim 3, wherein grain size of the micro nano powder having high thermal conductivity is 0.5~500 micrometers;
wherein grain size of the micro nano powder having low thermal conductivity is 0.25~400 micrometers; and
wherein grain size of the micro nano powder having mid-value thermal conductivity is 0.5~500 micrometers.

6. The method of claim 3, wherein adding micro nano powder into the pavement layers comprises:
substituting mineral powder in pavement base mixed materials with the micro nano powder.

7. A pavement structure, comprising:
at least two pavement layers which have gradient thermal conductivity;
wherein the at least two pavement layers are arranged in a descending order of thermal conductivity from top to bottom;
wherein the pavement layers comprises a top layer, a medium layer and a bottom layer, the top layer has the highest thermal conductivity, the bottom layer has the lowest thermal conductivity, and the thermal conductivity of the medium layer is between the thermal conductivity of the top layer and the thermal conductivity of the bottom layer; and
wherein the top layer includes micro nano powder having high thermal conductivity, the bottom layer includes micro nanopowder having low thermal conductivity, and the medium layer includes no micro nano powder or micro nano powder having mid-value thermal conductivity or micro nano powder having low thermal conductivity with the amount of the micro nano powder added into the medium layer being ½~1/10 of the amount of the micro nano powder added into the bottom layer.

8. The pavement structure of claim 7, wherein the top layer comprises 1%~10% of micro nano powder having high thermal conductivity;
the bottom layer comprises 5%~40% of micro nano powder having low thermal conductivity;
the medium layer comprises no micro nano powder or comprises one of the followings:
1%~10% of micro nano powder having mid-value thermal conductivity;
1%~10% of micro nano powder having low thermal conductivity.

9. The pavement structure of claim 8, wherein the micro nano powder having high thermal conductivity comprises: any or any combination of graphite material and carborundum.

10. The pavement structure of claim 8, wherein the micro nano powder having mid-value thermal conductivity comprises: any or any combination of siliconoxide, aluminum oxide and zinc oxide.

11. The pavement structure of claim 8, wherein the micro nano powder having low thermal conductivity comprises: any or any combination of mica powder, xylem fiber, fly ash, floater, sinking micro-sphere, glass wool, slag, polyurethane foaming plastic, polystyrene foam plastics and polyvinyl chloride foam plastics.

12. The pavement structure of claim 8, wherein grain size of the micro nano powder having high thermal conductivity is 0.5~500 micrometers.

13. The pavement structure of claim 8, wherein grain size of the micro nano powder having low thermal conductivity is 0.25~400 micrometers.

14. The pavement structure of claim 8, wherein grain size of the micro nano powder having mid-value thermal conductivity is 0.5~500 micrometers.

* * * * *